US011980904B2

(12) United States Patent
English

(10) Patent No.: US 11,980,904 B2
(45) **Date of Patent: *May 14, 2024**

(54) SPRINKLER GUARD FOR FIRE PROTECTION SPRINKLER ASSEMBLIES

(71) Applicant: Minimax Viking Research & Development GmbH, Bad Oldesloe (DE)

(72) Inventor: Scott A. English, Hastings, MI (US)

(73) Assignee: Minimax Viking Research & Development GmbH, Bad Oldesloe (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/580,761

(22) Filed: Jan. 21, 2022

(65) Prior Publication Data

US 2022/0219185 A1 Jul. 14, 2022

Related U.S. Application Data

(63) Continuation of application No. 16/639,306, filed as application No. PCT/US2019/058309 on Oct. 28, 2019, now Pat. No. 11,260,415.

(Continued)

(51) Int. Cl.

*B05B 15/16* (2018.01)
*A62C 31/02* (2006.01)

(Continued)

(52) U.S. Cl.

CPC .............. *B05B 15/16* (2018.02); *A62C 31/02* (2013.01); *A62C 31/28* (2013.01); *B05B 15/14* (2018.02)

(58) Field of Classification Search

CPC ......... B05B 15/14; B05B 15/16; A62C 31/02; A62C 31/28

(Continued)

(56) References Cited

U.S. PATENT DOCUMENTS 1,469,336 A 10/1923 Rowley
3,797,746 A 3/1974 Gray et al.

(Continued)

FOREIGN PATENT DOCUMENTS

KR 10-0821215 4/2008
KR 20100020774 2/2010

(Continued)

OTHER PUBLICATIONS

International Searching Authority, International Search Report and Written Opinion in International Appln. No. PCT/US2019/058309, dated Feb. 19, 2020, 16 pages.

(Continued)

*Primary Examiner* — Steven J Ganey
(74) *Attorney, Agent, or Firm* — Perkins Coie LLP

(57) ABSTRACT

A sprinkler guard for protection of a fire protection sprinkler to define one or more dimensional relationships between the guard and the sprinkler. The sprinkler guard includes a cage that defines an internal volume for housing operational components of the sprinkler including a fluid deflector and thermally responsive trigger. The sprinkler guard locates the deflector within the internal volume with an upper boundary of the cage spaced at a clearance distance from the fluid deflector and a lower boundary of the cage located between the deflector member and a fluid outlet of the sprinkler frame body. Affixed to the cage is a clamp assembly defining a hinged relationship for securing the sprinkler guard to the fire protection sprinkler and housing components of the sprinkler guard cage.

23 Claims, 4 Drawing Sheets

Related U.S. Application Data

(60) Provisional application No. 62/751,954, filed on Oct. 29, 2018.

(51) Int. Cl.
*A62C 31/28* (2006.01)
*B05B 15/14* (2018.01)

(58) Field of Classification Search
USPC ........................... 169/37, 51; 239/288–288.5
See application file for complete search history.

(56) References Cited

U.S. PATENT DOCUMENTS

| | | | | |
|---|---|---|---|---|
| 4,951,755 | A * | 8/1990 | Barnett .................. | A62C 35/02 169/38 |
| 5,632,339 | A | 5/1997 | Fenske et al. | |
| 5,893,418 | A | 4/1999 | Ponte | |
| 2007/0256844 | A1 | 11/2007 | Blasing et al. | |
| 2014/0361100 | A1 | 12/2014 | Hunsberger | |
| 2017/0326393 | A1 | 11/2017 | Oldham et al. | |
| 2019/0374969 | A1 | 12/2019 | Allen | |
| 2020/0353496 | A1 | 11/2020 | Lewis | |

FOREIGN PATENT DOCUMENTS

| | | |
|---|---|---|
| KR | 20100004181 | 4/2010 |
| KR | 101709996 | 2/2017 |
| WO | WO 2019/090135 | 5/2019 |

OTHER PUBLICATIONS

The Viking Corporation, Technical Datasheet, Sprinkler Water Shields and Guards, Sprinkler 130e-h, Form No. F_061289, Feb. 26, 2010, 4 pages.
The Viking Corporation, Technical Datasheet, Sprinkler Water Shields and Guards, Form No. F_061289, Rev. 18.1, Mar. 29, 2018, 4 pages.
The Viking Corporation, Technical Datasheet, Sprinkler Guards, Form No. F_012798, Rev. 16.1 P65, Oct. 11, 2018, 4 pages.
Minimax GmbH & Co. KG, Product Sheet, Sprinkler 21, M2-00-09, Sprinkler Guard, Dec. 19, 2018, 2 pages.
Minimax GmbH & Co. KG, Product Sheet, Sprinkler 21, M2-00-09, Sprinkler Cage, Undated, 1 page.

* cited by examiner

SPRINKLER GUARD FOR FIRE PROTECTION SPRINKLER ASSEMBLIES

PRIORITY CLAIM & INCORPORATION BY REFERENCE

This application is a continuation application of U.S. patent application Ser. No. 16/639,306, filed Feb. 14, 2020, which is a 35 U.S.C. § 371 application of International Application No. PCT/US2019/058309, filed Oct. 28, 2019, which claims the benefit of U.S. Provisional Application No. 62/751,954 filed Oct. 29, 2018, each of which is incorporated by reference in its entirety.

TECHNICAL FIELD

The present invention relates generally to protection devices for installed fire protection sprinklers. More particularly, the present invention is directed to a sprinkler guard for protecting a sprinkler in its installed and operative position.

BACKGROUND ART

Generally, automatic fire protection sprinklers include a frame for connection to a supply pipe of firefighting fluid and a deflector member coupled to the frame for distribution of the fluid to address a fire. The frame includes a formed body having an internal passageway with a fluid inlet for receipt of the fluid and a fluid outlet defining a discharge orifice from which the fluid is discharged. The deflector member is generally affixed at a fixed distance from the fluid outlet by a pair of frame arms that extend from the frame body. Externally formed about the sprinkler body proximate the outlet is a boss or enlarged formation for engagement by an installation tool such as a wrench to facilitate sprinkler installation. In an automatic sprinkler, the fluid discharge is automatically controlled by operation of a thermally responsive trigger or actuator that maintains a fluid tight seal at the discharge orifice by, for example, exertion of pressure on a sealing assembly disposed within the outlet. When the temperature surrounding the sprinkler is elevated within a range of the nominal temperature rating of the trigger, the trigger operates thereby permitting ejection and release of the sealing assembly and the discharge of fluid through the discharge orifice. The discharged fluid impacts the fluid deflection member and is distributed in a designed spray pattern and density in order to effectively address a fire and wet the surrounding area. Several factors can influence the water distribution patterns of a sprinkler including, for example, the installation orientation and the geometry of the fluid deflection member, the distance between the deflection member and the discharge orifice, and/or the shape of the sprinkler frame to which the deflection member is coupled. Accordingly, the fluid control, distribution and performance of an automatic sprinkler is dependent upon the integrity of the sprinkler assembly and its individual components.

Automatic sprinklers are installed in a variety of environments which can expose the sprinklers to accidental impact and subject them to mechanical damage such as in low elevation or low clearance areas and/or near a high degree of human or mechanical activity. For example, storage type automatic sprinklers can be installed in a storage warehouse beneath the warehouse ceiling and above the storage area and commodities to be protected. In the storage environment, stored commodities are stacked and moved by operating personnel or material handling equipment such as forklifts. The movement of material or mechanical equipment proximate to an installed automatic sprinkler exposes the sprinkler to possible accidental impact and damage. If the trigger of the sprinkler is damaged, water may discharge from the sprinkler; or if the deflector or frame is damaged, the sprinkler may not distribute fluid in the proper pattern.

It is well known to use a sprinkler guard to protect an installed sprinkler. Sprinkler guards are configured for protecting sprinklers installed in an upright orientation, in which fluid is discharged from the sprinkler body toward the ceiling and then redirected downward by the fluid deflection member toward the protection area. Sprinkler guards are also configured for protecting sprinklers installed in a pendent orientation, in which fluid is discharged downward to impact the fluid deflection member for distribution below the sprinkler over the protection area. Generally, the sprinkler guard includes a cage-like enclosure with one open-ended base. The guard is installed by sliding the guard over the sprinkler through the base so that the sprinkler is coaxially centered within the cage. The guard includes a securement assembly that secures the open-ended base of the cage about the sprinkler body against the enlarged boss of the sprinkler body. Illustrative examples of these known sprinkler guards are shown and described in U.S. Pat. Nos. 1,469,336; 3,797,746; 5,632,339 and 5,893,418.

Although these cage-like enclosures can protect a sprinkler, the guards are bulky with a profile that is large relative to the sprinkler being protected so as to present an overall guarded sprinkler assembly that can complicate sprinkler installation particularly in low clearance areas and/or or otherwise visibly detract from the surrounding environment. In the known sprinkler guards of U.S. Pat. Nos. 1,469,336; 3,797,746; 5,632,339 and 5,893,418, the cage volume is relatively large as compared to the securement assembly. For example, the sprinkler guards in each of U.S. Pat. Nos. 1,469,336; 3,797,746 and 5,632,339 have a cage that encompasses or circumscribes the deflector member, frame arms and wrench boss. In each of the known sprinkler guards of U.S. Pat. Nos. 1,469,336; 3,797,746; 5,632,339 and 5,893,418, the cage of the sprinkler guard extends axially from a distance spaced from the deflector member to a location aligned with the frame body at or below the fluid outlet. Accordingly, for these known sprinkler guards, the internal volume of the cage is relatively large with respect to the sprinkler to encompass or circumscribe the deflector and most if not all of the frame arms. There thus remains a need for a sprinkler guard and guarded sprinkler assembly with a compact profile that sufficiently protects the critical operating components of a fire protection sprinkler and that can be used in low clearance areas and/or otherwise minimize any visible detraction from the surrounding environment. Moreover, there remains a need for sprinkler guards that can be assembled over a fire protection sprinkler either prior to sprinkler installation or thereafter.

DISCLOSURE OF INVENTION

Preferred embodiments of a sprinkler guard and guarded sprinkler assembly are provided in which the sprinkler guard includes a preferred cage and securement arrangement that facilitates assembly, handling and installation. Moreover, the preferred sprinkler guard provides for one or more preferred dimensional relationships with respect to the fire protection sprinkler being protected to present a compact assembly that can facilitate installation of a guarded sprinkler assembly in a low clearance area and minimize the space occupied by the guarded sprinkler assembly.

Preferred embodiments of a sprinkler guard protect a fire protection sprinkler having a frame body and a fluid deflector member affixed to the frame body. The sprinkler guard includes a preferred securement assembly and a preferred cage affixed to the securement assembly having a plurality of guard members defining an internal volume centered about a central vertical axis. The plurality of guard members having a first portion traversing about the internal volume to define a preferred upper boundary of the cage. The plurality of guard members also has a second portion traversing about internal volume to define a preferred lower boundary of the cage. The plurality of guard members defining a preferred insertion passageway proximate the lower boundary for receipt of the sprinkler to locate the fluid deflector member of the sprinkler within the internal volume and centered along the vertical axis. The preferred sprinkler guard defines one or more dimensional relationships with the sprinkler. Preferred dimensional relationships can be defined: (i) wherein a fixed distance between the fluid deflector member and the frame body and a clearance distance from the upper boundary of the cage to the deflector define a ratio of fixed distance-to-clearance distance (H1:H2) that ranges from 1:1 to 2:1; (ii) wherein a deflector diameter of the fluid deflector member and the clearance distance define a ratio of defector diameter-to-clearance distance (Dia:H2) that ranges from 1.8:1 to 2:1; (iii) wherein a cage diameter of the cage and the deflector diameter define a ratio of cage diameter-to-deflector diameter (WCGE:Dia) that ranges from 1:7 to 2:1; and (iv) wherein the fluid deflector member is affixed to the frame body by a pair of frame arms having an arm width therebetween and an opening width of the insertion passageway and the arm width define a ratio of opening width-to-arm width (WOPN:WARM) that ranges from 1:1 to 1.2:1.

Preferred embodiments of a sprinkler guard include a cage and a clamp assembly secured to and preferably riveted to the cage to define a preferred hinged arrangement. In preferred guarded sprinkler assemblies, the preferred clamp assembly locates operational components of a sprinkler within the cage. The preferred hinge arrangement maintains the cage and clamp assembly connected to one another when handling and installing the guard about a sprinkler thereby minimizing the number of separate components to be handled during an installation of the guard about a sprinkler. In addition to securing the cage about the sprinkler, the clamp assembly engages the sprinkler in a preferred manner that provides rigidity to the guarded sprinkler assembly. The cage defines a preferred profile about the sprinkler that is compact and in close proximity to the fluid deflecting components of the sprinkler without negatively impacting the firefighting and water distribution functions of the sprinkler.

A preferred embodiment of a fire protection sprinkler guard includes a wire cage that defines an internal volume centered about a central axis. The cage includes a plurality of terminal wire free end portions that are preferably aligned in a plane. A clamp assembly is affixed to the cage in which the clamp assembly has a first clamp member and a second clamp member which define a hinged relationship aligned in the first plane. The hinged relationship has an open state to define an opening to the cage for locating operational components of the sprinkler in the internal volume. The hinged relationship has a closed state to define a plurality of compartments for housing the wire free end portions.

A preferred embodiment of a guarded sprinkler assembly includes a sprinkler having a frame with a body defining an inlet, an outlet and an internal passageway extending between the inlet and outlet along a sprinkler axis. The body includes a wrench boss formed about the outlet with an external thread about the body for coupling to fluid supply pipe. The frame includes a pair of frame arms formed about the sprinkler body and disposed in a first plane. The frame arms extend from the sprinkler body away from the outlet in the direction of the sprinkler axis and a deflector member is coupled to the frame arms to be located axially from the body at fixed distance and centered on the sprinkler axis. The deflector has a periphery defining an outer diameter of the deflector. A wire cage is disposed about the sprinkler to define an internal volume axially aligned with the sprinkler axis with operational components of the fire sprinkler located within the internal volume. The cage preferably includes a plurality of terminal wire free end portions aligned in the first plane. A preferred clamp assembly is affixed to the cage. The clamp assembly has a first clamp member and a second clamp member which define a hinged relationship with the cage that is aligned in the first plane such that at least one of the first and second clamp members pivot with respect to the first plane to provide access to a cage opening. The preferred hinged relationship has an open state to define access for locating the operational components of the sprinkler in the internal volume and the hinged relationship has a closed state to restrict the cage opening and define a plurality of compartments for housing the wire free end portions.

BRIEF DESCRIPTION OF DRAWINGS

The accompanying drawings, which are incorporated herein and constitute part of this specification, illustrate exemplary embodiments of the invention, and together, with the general description given above and the detailed description given below, serve to explain the features of the invention. It should be understood that the preferred embodiments are some examples of the invention as provided by the appended claims.

MODE(S) FOR CARRYING OUT THE INVENTION

Figure 1:
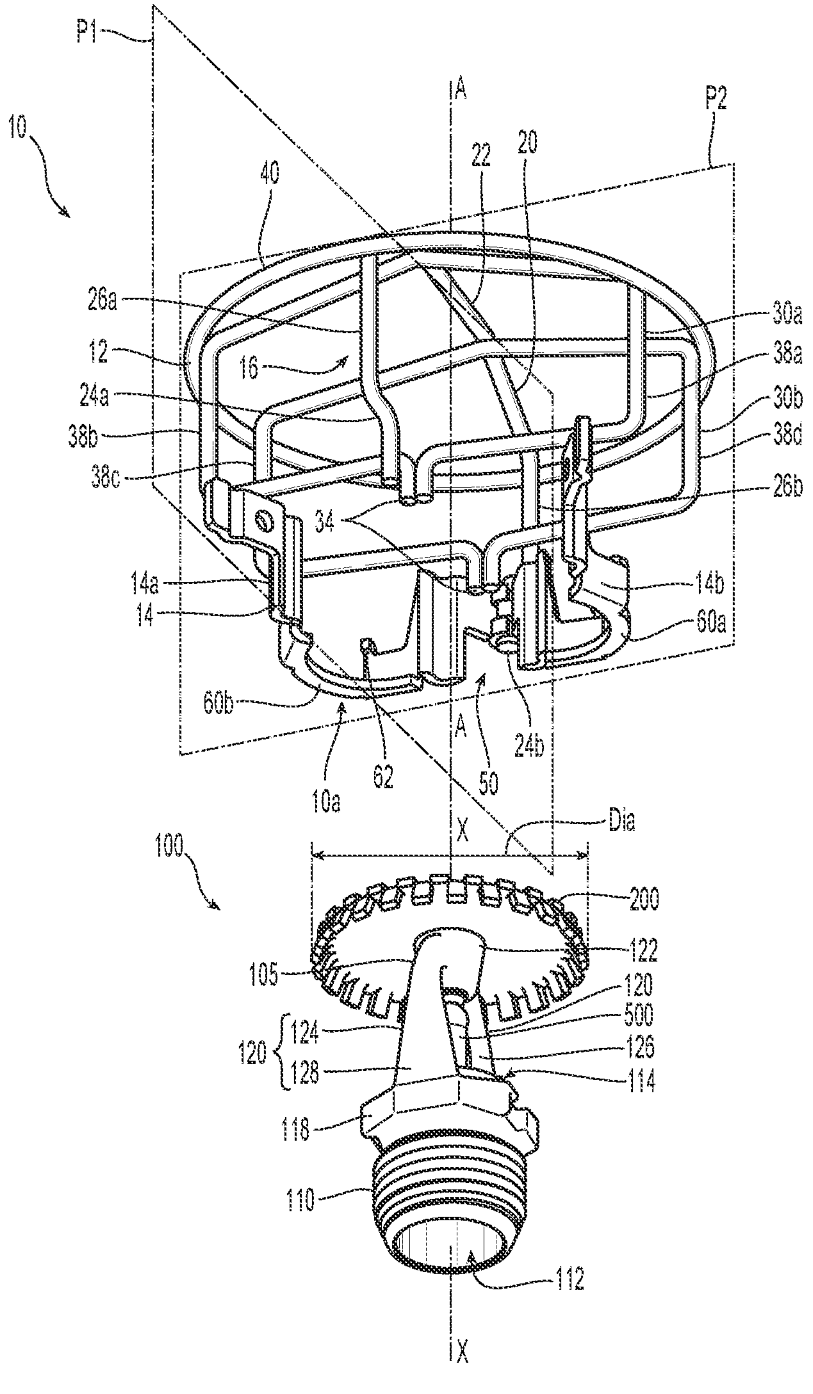
FIG. 1 is an exploded view of one preferred embodiment of a guarded sprinkler assembly having a preferred sprinkler guard.

Shown in FIGS. 1 and 2A-2D are various views of a guarded sprinkler assembly that includes a preferred embodiment of a sprinkler protective housing or guard 10. The guard 10 includes a preferred cage 12 and a securement assembly preferably embodied as a clamping assembly 14 for securely placing the protective housing about a fire protection sprinkler as illustrated, for example, in FIGS. 2A and 2B. The cage 12 defines an internal volume 16 about a central vertical axis A-A for housing operational components of the fire sprinkler. The cage 12 includes a plurality of guard members 20, 30*a*, 30*b* arranged and affixed to one another about the central vertical axis A-A with a circumscribing member 40 to define the perimeter and bounds of the internal volume 16 of the cage 12 including a lower boundary 12*a* and an upper boundary 12*b*. The geometry and spacing between the guard members 20, 30*a*, 30*b* define a preferred insertion passageway or opening 10*a* proximate the lower boundary 12*a* of the cage 12 for inserting a sprinkler 100 into the cage 12 to locate operational components of the sprinkler within the protective internal volume 16 of the cage 12. In preferred embodiments of the cage 12, the guard member spacing minimizes or eliminates the stress, distortion or deflection on the guard members 20, 30*a*, 30*b* when inserting the sprinkler into the cage 12.

The preferred clamp assembly 14 is preferably secured to the cage 12 to define a preferred hinged arrangement or relationship that limits or restricts the insertion passageway to secure the sprinkler guard 10 to the sprinkler. The preferred hinge arrangement maintains the cage 12 and clamp assembly 14 connected to one another when handling and installing the guard about a sprinkler thereby minimizing the number of separate components to be handled during an installation process. In addition to securing the cage 12 about the sprinkler, the clamp assembly 14 engages the frame of the sprinkler in a preferred manner that provides rigidity to the guarded sprinkler assembly. Because the sprinkler guard 10 provides protection to an installed sprinkler, the guard 10 does not negatively impact the fluid distribution and firefighting function of the sprinkler. In addition, the cage 12 defines a preferred profile that is compact and in close proximity to the fluid deflecting components of the sprinkler without negatively impacting the function of the sprinkler.

In the preferred embodiments of the cage 12, the first guard member 20 is disposed in a first plane P1 with the second guard member 30*a* and the third member 30*b* extending parallel to a second plane P2 which extends perpendicular to and intersects the first plane P1 to define a central vertical axis A-A of the guard 10. Each of the guard members 20, 30*a*, 30*b* and the circumscribing member 40 are preferably formed from a metal wire or rod member of suitable gauge to provide protection to the sprinkler. A preferred wire metal wire is about 0.1 inch and more preferably 0.09 inch in diameter steel wire. The first guard member 20 is preferably formed with a central portion 22 having a pair of terminal end portions 24*a*, 24*b* equidistantly spaced apart from one another about and extending to one side of the central portion 22. In the guard 10, the central horizontal portion 22 intersects the central axis A-A in the first plane P1 with the pair of terminal end portions 24*a*, 24*b* equidistantly spaced apart from one another about the central vertical axis A-A. The first guard member 20 includes two portions disposed about the central vertical axis A-A with each of the two portions extending between the horizontal portion 22 and one of the terminal end portions 24*a*, 24*b* to define a first pair of perimeter posts 26*a*, 26*b* of the cage.

Figure 2A:
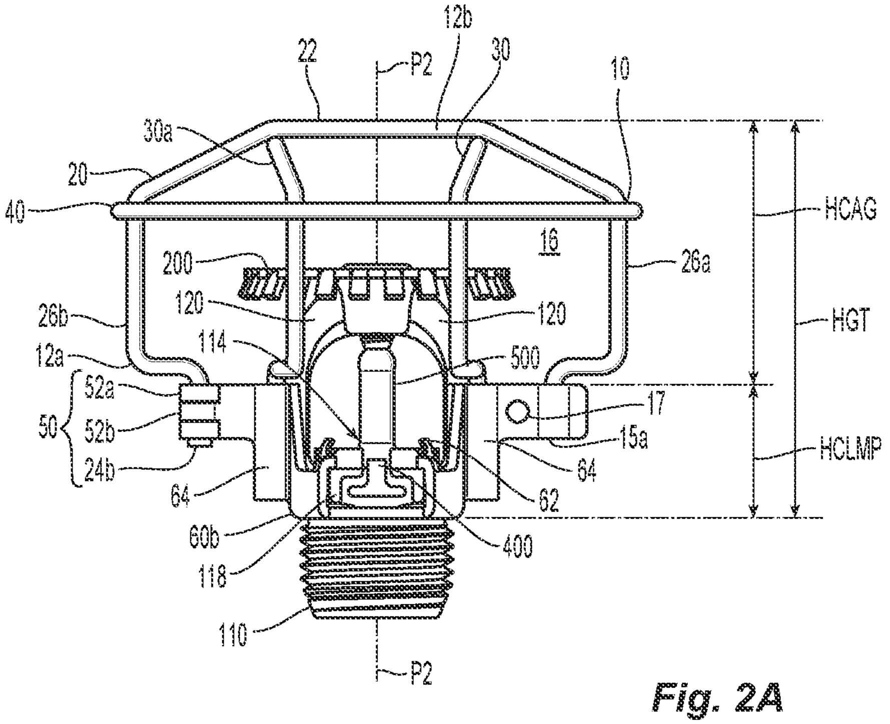
FIGS. 2A-2B are front and side elevation views of a preferred embodiment of the guarded sprinkler assembly of FIG. 1, FIGS. 2C-2D are plan end views of the guarded sprinkler assembly of FIG. 2A.
Figure 2B:
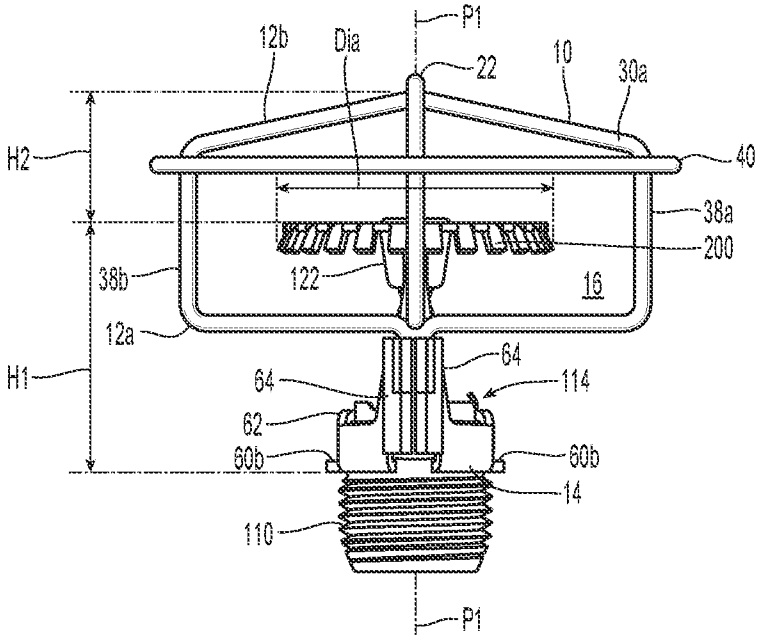
Figure 2C:
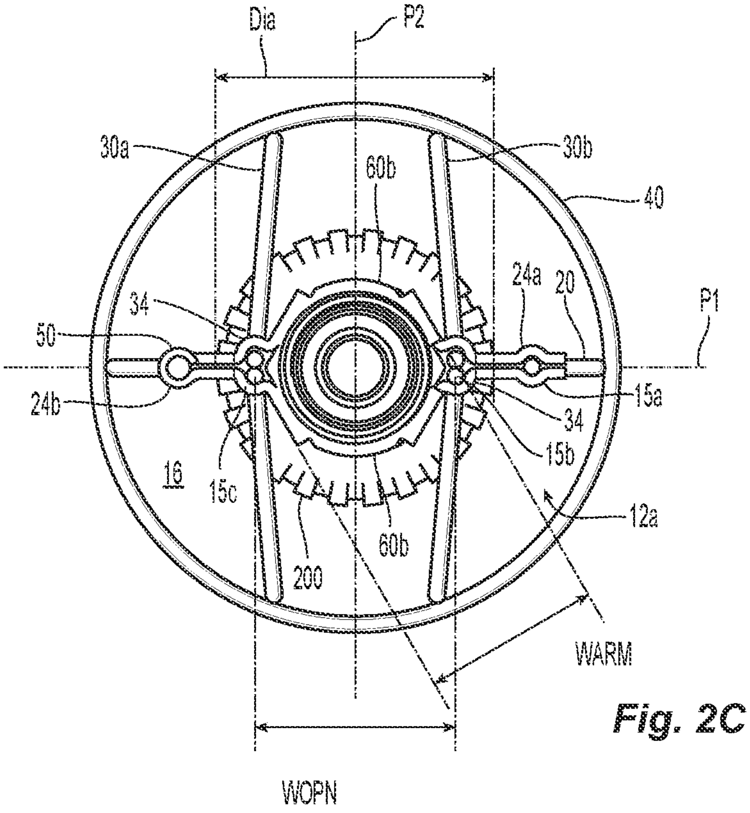
Figure 2D:
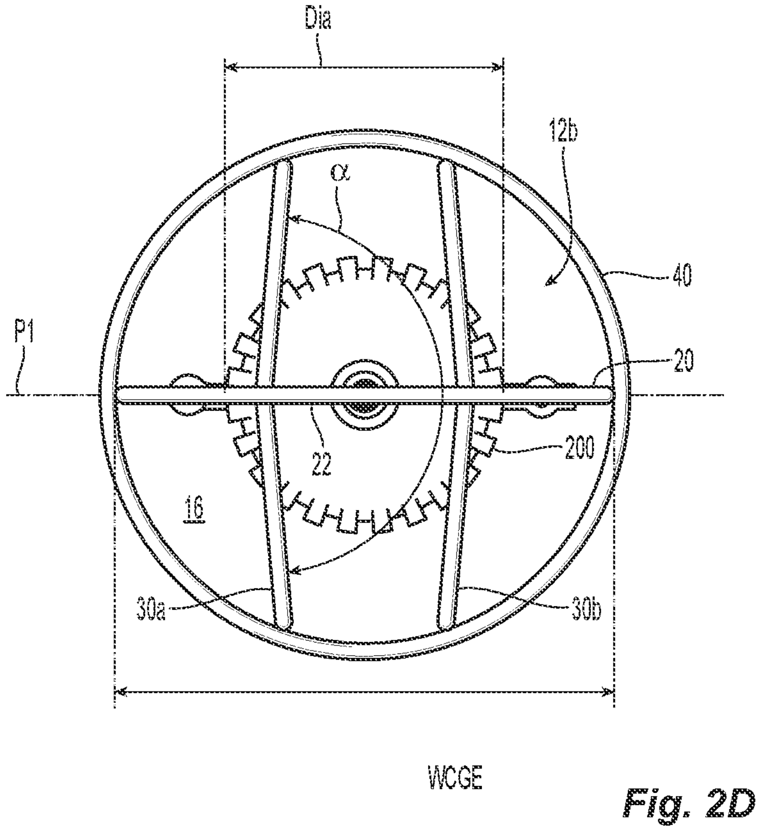

In the cage 12, the second guard member 30*a* and a third guard member 30*b* are in a preferably fixed spaced apart relationship from one another equidistantly about the central vertical axis A-A to define the preferred cage insertion passageway or opening 10*a* for inserting operational components of a sprinkler into the cage. The wire forming second and third guard members 30*a*, 30*b* preferably define a closed form with the ends of the wire being brought and affixed together to form a central post 34 of the guard members 30*a*, 30*b*. As seen in FIG. 2D, the closed form of each guard member 30*a*, 30*b* is preferably bent out of plane to define an included angle between the outer edges of the closed form to define an included angle $\alpha$ of 150°-175°. In the cage 12, each of the second and third guard members 30*a*, 30*b* are affixed to the horizontal portion 22 of the first guard member 20 by welding or brazing such that the central posts 34 of the second and third guard members 30*a*, 30*b* are disposed in the first plane P1 in general planar alignment with the terminal end portions 24*a*, 24*b* of the first guard member 20.

In the cage formation, portions of the second and third guard members 30*a*, 30*b* are disposed radially from the central vertical axis A-A to define a second pair of perimeter posts 38*a*, 38*b* and a third pair of perimeter posts 38*c*, 38*d*. Preferably each of the perimeter posts 26*a*, 26*b*, 38*a*, 38*b*, 38*c*, 38*d* extends axially parallel to the central vertical axis A-A with the first pair of perimeter posts 26*a*, 26*b* preferably disposed in the first plane P1. Alternatively, the perimeter posts can define alternate geometries in traversing about the internal volume 16 in the direction from the clamp assembly 14 toward the preferred central horizontal portion 22 of the first guard member 20. The perimeter of the cage 12 is preferably circular with the perimeter posts 26*a*, 26*b*, 38*a*, 38*b*, 38*c*, 38*d* or portions thereof spaced equidistantly from the central vertical axis A-A of the cage 12. In such a preferred embodiment of the cage 12, the circumscribing member 40 is preferably of a circular geometry and consists of a single circular member in tangential contact with the perimeter posts 26*a*, 26*b*, 38*a*, 38*b*, 38*c*, 38*d*.

The preferred clamp assembly 14 affixed to the cage 12 preferably includes a first clamp member 14*a* and a second clamp member 14*b* to define a preferred hinged relationship or arrangement 50 with respect to one another about one of the terminal end portions 24*b* of the first guard member 20. More preferably, the terminal end portion 24*b* forms a pin about which each of the clamp member 14*a*, 14*b* rotate. In a preferred embodiment, the terminal end portion 24*b* is preferably deformed or staked to form a rivet to secure the clamp members 14*a*, 14*b* in the hinged relationship. The hinged relationship has an open state, shown in FIG. 1, to provide access to the cage opening 10*a* and the internal volume 16 for insertion, removal or adjustment of a sprinkler within the cage 12. The hinged relationship 50 has a closed state, as seen in FIG. 2A-2C, to restrict the cage opening 10*a* and define a plurality of compartments 15*a*, 15*b*, 15*c* for housing the central posts 34 of the second and third guard members 30*a*, 30*b* and the other of the terminal end portions 24*a* of the first guard member 20 opposite the hinged relationship 50.

In the closed state of the clamp assembly 14, the first and second clamp members 14*a*, 14*b* include bearing plates 60*a*, 60*b* opposed to one another about the first plane P1. In the clamp members 14*a*, 14*b* and the bearing plates 60*a*, 60*b* defining a preferred arched or arcuate geometry for securement about a fire sprinkler body. Preferably respectively formed at one end of each of the clamp members 14*a*, 14*b* is a knuckle 52*a*, 52*b* for receipt of the terminal end portion 24*b* of the first guard member 20 as a pin to form the preferred hinged relationship 50. In the preferred configuration of the sprinkler guard 10, the hinge arrangement 50 is axially disposed between the arcuate bearing plates 60*a*, 60*b* and the horizontal portion 22 of the first guard member 20. Each of the opposed arcuate bearing plates include one or more clip formations or members 62 to secure the arcuate bearing plates to the sprinkler body. Preferred embodiments of the arcuate bearing plates 60*a*, 60*b* also include a plurality of bracing members that extend from each of the bearing plates in the direction of the vertical central axis to contact the sprinkler frame in a preferred manner as described herein to stiffen and provide rigidity to the guarded sprinkler assembly. The plurality of bracing members 64 preferably has four bracing members in which each arcuate bearing plate 60*a*, 60*b* includes two bracing members about the second plane P2 intersecting and perpendicular to the first plane P1. As seen in FIG. 2C, the configuration of the clamp assembly 14 locates the compartments 15*b*, 15*c* for receipt of the central posts 34 of the second and third guard members 30*a*, 30*b* laterally about the respective arcuate bearing plates 60*a*, 60*b* and in alignment with the first plane P1.

Shown in FIG. 1 and the open state of the clamp assembly 14, the guard 10 can be disposed over and about an illustrative embodiment of a fire protection sprinkler 100 having a frame 105. The frame 105 includes a frame body 110 having an inlet 112, an outlet 114 aligned with one another along a longitudinal sprinkler axis X-X. The preferred frame 105 includes a pair of frame arms 120 to support and locate a deflector 200 at a fixed distance along the longitudinal sprinkler axis from the sprinkler body 110 and the outlet 114.

Firefighting fluid is delivered to the sprinkler inlet 112 at a working pressure and discharged from the outlet 114 to impact the deflector for distribution in an expected density and/or geometry about the guarded sprinkler assembly. The outer surface of the sprinkler body 110 is configured for connecting the sprinkler 10 to a fluid supply pipe. For example, the body 110 can include an external male pipe thread 111. Preferred embodiments of the external male pipe thread 111 include a nominal ½ inch-14 NPT. Larger threaded connection can include nominal ¾ inch-14 NPT pipe. To facilitate securement of the sprinkler 110 to a fluid pipe fitting such as, for example a tee fitting or union, the sprinkler body 110 includes a wrench boss 118 with a preferably hexagonal perimeter disposed about the outlet 114 and centered about the sprinkler axis X-X to provide two or more flat surfaces for engagement by an installation tool, such as for example, a sprinkler installation wrench.

To secure the sprinkler guard 10 to the sprinkler 100, the clamp assembly 14 and its arcuate bearing plates 60*a*, 60*b* can wrap about and preferably bear against the sprinkler body 110 between the wrench boss 118 and the external thread 111. Moreover, the clip members 62 are preferably dimensioned to define a recess sufficient to accommodate the thickness or height of the wrench boss 118 and secure the clamp assembly 14 about the sprinkler body 110 as seen, for example, in FIGS. 2A and 2B.

Referring again to FIG. 1, the pair of frame arms 120 of the sprinkler frame 105 extend from the body 110 at diametrically opposed sides of the outlet 114 and converge toward one another to form and/or support a deflector boss 122 that is centered along the sprinkler axis X-X for support of the deflector 200 at the fixed distance from the outlet 114. Each of the frame arms 120 has a peripheral surface 124 and an interior surface 126 with respect to the sprinkler axis X-X with the interior surface 126 being closest to or confronting the longitudinal axis X-X. The peripheral and interior surfaces 124, 126 extend from the body 110 to the boss 122 to define the frame arm profile. Each of the frame arms 120 includes a transition surface 128 that extends between the peripheral surface 124 and the interior surface 126. Individually and/or collectively the peripheral and transition surfaces 124, 128 define one or more surfaces against which the bracing members 64 of the clamp assembly 14 can form a surface contact engagement or embrace to stabilize the sprinkler guard 10 about the sprinkler frame 105 and provide rigidity to the assembly as seen for example in FIGS. 2A-2D.

In the closed state of the clamp assembly 14 about the sprinkler 100, the ends 24*a*, 34 of the guard members 20, 30*a*, 30*b* are received in the compartments of the closed compartments 15*a*, 15*b*, 15*c* of the clamp assembly 14. The clamp members 14*a*, 14*b* can be secured to one another by an appropriate fastening device 17 such as for example a screw and nut assembly (not shown). In the preferred guarded sprinkler assembly, the clamp assembly 14 engages the sprinkler frame arms 120 in a manner that orients the frame 105 to locate the frame arms 120 in the first plane P1 of the guard 10 aligned with the compartments 15*a*, 15*b*, 15*c* and hinge 50. The spaced apart bracing members 64 expose a sufficient portion of the wrench boss 118 to allow for tool access in order to adjust connection of the sprinkler to a fluid supply pipe with the guard 10 installed.

The sprinkler guard 10 protects the operative components of the sprinkler 100 in the installed and operative position of the sprinkler. The operative components can include a fluid deflecting member or deflector 200 and/or a thermally responsive actuating device 500. Preferred embodiments of the sprinkler 10, are preferably configured as automatic sprinklers such that fluid discharge from the connected sprinkler 10 and its outlet 114 is controlled by a seal assembly 400 that is disposed within the passageway 116 proximate the outlet 114 as seen in FIG. 2A to occlude the outlet 114. The seal assembly 400 is maintained within outlet 114 of the sprinkler body 110 by the thermally responsive element or trigger 500 preferably aligned along the sprinkler axis X-X between the sealing assembly 400 and the deflector 200. The guard 10 preferably engages the sprinkler 100 such that the sprinkler axis X-X coaxially aligns with the sprinkler guard axis A-A so as to center the thermally responsive element 500 in the cage 12 and maximize the protection about the trigger 500.

The thermally responsive element 500 is preferably embodied as a thermally responsive frangible glass bulb, as seen in FIG. 1, but can be alternatively embodied as a thermally responsive soldered assembly, or mechanical or electrically actuated assembly provided the assembly can seat and unseat the seal assembly 400 in respective unactuated and actuated states of the sprinkler. In the presence of a sufficient level of heat, the thermally responsive element 500 operates or triggers to release the sealing assembly 400 and permit the supplied firefighting fluid to discharge from the outlet 114 to impact the deflector 200 for distribution of the fluid in a desired manner to address a fire. Accordingly, the guard 10 engages a sprinkler in its installed and operative position in a manner that protects the deflector 200 but minimizes or eliminates any negative impact on the fluid distribution function.

The deflector 200 is illustratively shown bent or formed for installation in an upright orientation in which supplied firefighting fluid is discharged from the outlet 114 to impact the deflector 200 in an upward direction. Alternatively, the affixed deflector can be formed or configured for a pendent orientation in which fluid is discharged in a downward direction or in a sidewall orientation in which water is discharged horizontally. The deflector 200 is affixed to the boss 122 to locate the deflector 200 at a first fixed distance from the body 110. For example, the deflector 200 is located at a fixed distance H1 from the region between the boss 118 and the external thread 111 against which the bearing plates 60*a*, 60*b* bear of the clamp assembly 14. Accordingly, in the guarded sprinkler assembly, the deflector 200 is located at a preferred fixed distance from one or more features or structures of the sprinkler guard 10. For example, the deflector 200 is located at a preferred second fixed distance H2 from the central portion 22 of the first guard member 20. In one preferred aspect, the second fixed distance H2 defines the clearance above the deflector 200 and indirectly defines the clearance below the deflector 200 within the internal volume 16 of the cage 12 to manipulate and position the sprinkler 100 and its deflector to secure the guard 10 about the sprinkler 200. In another preferred aspect, the second fixed distance H2 defines a preferred profile of the cage 12 about the deflector 200 that is compact enough to protect the deflector yet not interfere with the distribution function of the deflector while exposing the other portions of the sprinkler frame 105 to install or loosen the sprinkler 100 from the fluid supply piping with the sprinkler guard 10 on. Moreover, the cage 12 and the perimeter posts 26*a*, 26*b*, 38*a*, 38*c*, 38*d* define the preferably circular perimeter and preferred radial clearance about the deflector 200.

Accordingly, in the preferred guarded sprinkler assembly, the sprinkler 100 and the guard 10 define one or more preferred dimensional relationships. For example, in one preferred embodiment with reference to FIG. 2A, the sprinkler guard 10 defines a preferred overall or maximum height HGT of about 2.25 inches preferably measured from the central portion 22 to the bearing plates 60*a*, 60*b* of the clamp assembly 14. The clamp assembly 14 has a preferred height HCLMP of about 0.75 inch to provide for a cage height HCAG of about 1.5 inch. Thus, a preferred cage height-to-clamp height ratio (HCAG:HCLMP) is about 2:1 with the maximum guard height-to-cage height ratio (HGT:HCAG) being about 1.5:1. Any approximated preferred dimension as an about value herein could vary up to 10%. The clearance distance H2 can be equal to the deflector-to-body distance H1 and is more preferably less than the deflector-to-body distance H1. In a preferred embodiment of the sprinkler 100 in which the deflector-to-body distance H1 is about 1.5 inches, the clearance distance H2 is preferably about 0.75 inch. Accordingly, a preferred deflector-to-body distance H1-to-clearance H2 ratio (H1:H2) is about 2:1. Alternate embodiments can provide for a deflector-to-body distance H1-to-clearance H2 ratio (H1:H2) that can be any one of 1.5:1 or 1:1 or any ratio in between 1:1 to 2:1. In another preferred relationship of the guarded sprinkler assembly, the deflector 200 defines a preferred deflector diameter Dia to clearance H2 ratio (Dia:H2) that preferably ranges from 1.8:1 to 2.1:1 and is preferably about 2:1 where preferred deflectors 200 define an outer diameter Dia that ranges from 1.4-1.6 inch. As seen in FIG. 2D, the preferably circular cage 12 defines a cage diameter or width WCGE. For the preferred deflector diameter Dia, the cage diameter WCGE is about 2.75 inches. Accordingly, a preferred cage-to-deflector diameter ratio (WCGE:Dia) ranges from about 1.7:1 to about 2:1.

As previously noted and with reference to FIG. 1, the spacing between the second and third guard members 30*a*, 30*b* preferably define the cage opening 10*a* for insertion of the sprinkler operational components. With the clamp assembly 14 in its open state, the opening 10*a* defines a preferred maximum width WOPN, as seen in FIG. 2C, between the central posts 34 of the second and third guard members 30*a*, 30*b*. In the open state of the clamp assembly 14, the central posts 34 can be free for displacement to define a resiliently variable width WOPN in order to expand the cage opening for sprinkler insertion. Alternatively, the central posts 34 of the second and guard members can be fixed with respect to one another to define a fixed width WOPN opening in which to insert a sprinkler. For example, the central posts 34 can be fixed to one of the clamp members 14*a*, 14*b*.

With reference to FIGS. 2C and 2D, shown are additional preferred dimensional relationships between the sprinkler 100 and the guard 10. For the deflector 200 and its outer perimeter or periphery defining an outer diameter Dia, the width WOPN of the cage opening 10*a* is preferably equal to or smaller than the deflector diameter Dia. More preferably, the width WOPN of the cage opening 10*a* is preferably equal to or slightly greater than the span or width WARM between the maximum peripheral surfaces 124 of the frame arms 120 of the sprinkler 100 to stiffen and/or compact the guarded assembly in the closed state of the clamp assembly 14. In one preferred dimensional relationship between the sprinkler 100 and the guard 10, the ratio of the cage opening-to-arm width (WOPN:WARM) preferably ranges from 1.1:1 to 1.2:1.

Preferably, each of the guard members 20, 30*a*, 30*b* traverse about the internal volume 16 in a manner to define the lower end perimeter or boundary 12*a* of the preferred profile of the cage 12 and the opposite upper end perimeter or boundary 12*b* of the preferred profile of the cage 12 with the upper boundary opposite the clamp assembly 14 and the lower boundary between the upper boundary 12*a* and the clamp assembly 14. With reference to FIGS. 2B and 2C, each of the guard members 20, 30*a*, 30*b* have portions that traverse about the internal volume 16 between the deflector 200 and the outlet 114 of the sprinkler frame 105 just outside the frame arms 120 to define the lower boundary 12*a* of the cage 12. Moreover, portions of the guard members 30*a*, 30*b* traverse the internal volume 16 below the deflector 200 inside the deflector perimeter and diameter Dia. The traversing portions extend preferably perpendicular to the first plane P1. Accordingly, in a preferred profile embodiment of the cage 12, the lower end perimeter or boundary 12*a* of the cage 12 is axially located between the deflector member 200 and the frame body 110 of the sprinkler 100 and more preferably axially spaced from the fluid outlet 114 of the frame body 110.

Figure 3A:
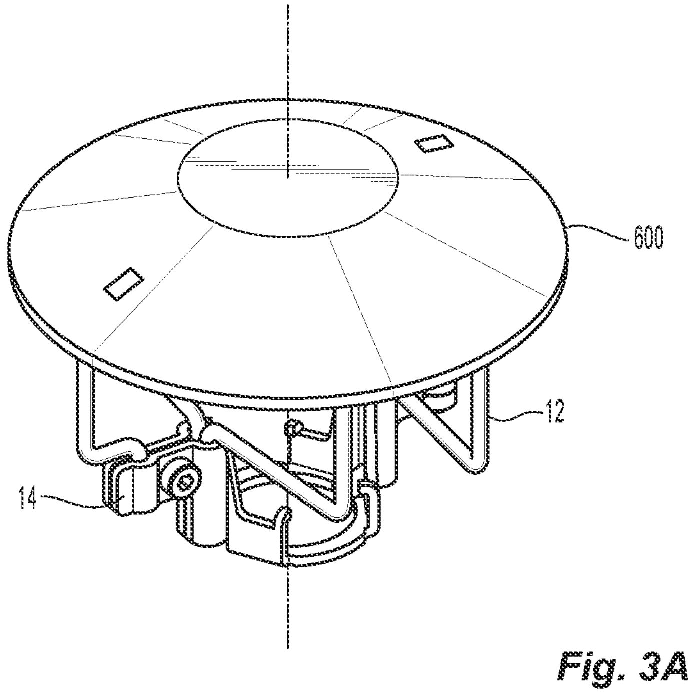
FIGS. 3A-3B are various perspective views of a shielded sprinkler guard using the sprinkler guard of FIG. 1.
Figure 3B:
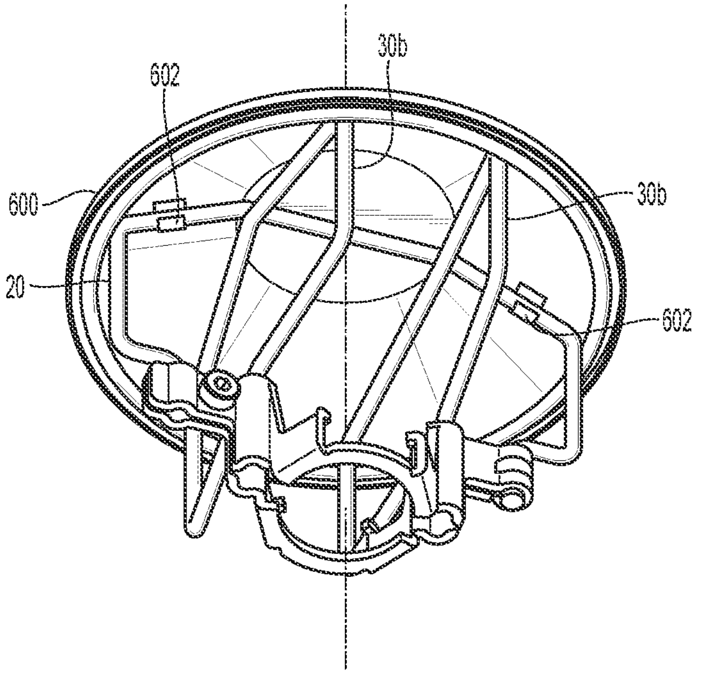

At the upper boundary 12*b* of the cage, each of the guard members 20, 30*a*, 30*b* have portions that traverse the internal volume 16 above the deflector 200. With reference to FIGS. 2A and 2B, the traversing portion of each guard members 20, 30*a*, 30*b* that extends between central horizontal portion 22 and their respective vertical perimeter posts is preferably sloped or skewed with respect to the first and second planes P1, P2. Accordingly, the upper boundary 12*b* of the cage defines a preferably frustoconical framework. Referring now to FIGS. 3A and 3B, the upper boundary 12*b* of the cage 12 can support a water shield 600 for shielding a guarded sprinkler from water discharge from surrounding sprinklers in a fire protection installation. More specifically, a guarded sprinkler assembly can be in an installed operative location that is below sprinklers located at a higher elevation. Fire protection applications that may require water shielding include in-rack storage sprinkler systems, under grating, on pilot sprinklers for deluge systems, and outdoors as a weather shield. Water discharged from the higher sprinklers may impact the thermally responsive trigger 500 of the guarded sprinkler and prevent its proper thermal response. Accordingly, a water shield disposed atop the sprinkler guard 10 can prevent higher elevation water droplets from impacting the guarded sprinkler and its trigger 500. The water shield 600 is preferably frustoconical in shape to fit atop the frustoconical upper boundary 12*b* of the cage 12. To secure the shield 600 to the cage 12, the inner surface of the shield 600 includes one or more preferably integrally formed hooks or clips 602 for engaging guard members of the cage 12 of the sprinkler guard.

While the present invention has been disclosed with reference to certain embodiments, numerous modifications, alterations, and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A guarded sprinkler assembly comprising:

a sprinkler including:

a frame including a body defining an inlet, an outlet and an internal passageway extending between the inlet and the outlet along a sprinkler axis, the body including a wrench boss formed about the outlet and an external thread about the body for coupling to a fluid supply pipe, the frame including a pair of frame arms formed about the sprinkler body and disposed in a first plane, the frame arms extending from the sprinkler body away from the outlet in a direction of the sprinkler axis; and a deflector member coupled to the frame arms located axially from the body at a fixed distance and centered on the sprinkler axis, the deflector having a periphery defining an outer diameter of the deflector and formed for installation in a pendent orientation; and a wire cage disposed about the sprinkler defining an internal volume axially aligned with the sprinkler axis with operational components of a fire sprinkler located within the internal volume, the cage including a first guard member including a horizontal portion intersecting the sprinkler axis disposed in the first plane and a first pair of perimeter posts of the cage extending from the horizontal portion disposed about the sprinkler and in the first plane; the cage including a second guard member and a third guard member in a fixed spaced apart relationship from one another equidistantly about the sprinkler, the second guard member defining a second pair of perimeter posts and the third guard member defining a third pair of perimeter posts of the cage, each of the first, second and third guard members including a skewed portion traversing at least a portion of the internal volume between the horizontal portion and the respective perimeter posts to define a first boundary axially spaced from the deflector member; and each of the second and third guard members including a portion traversing at least a portion of the internal volume proximate the frame body to define a second boundary axially spaced from the first boundary.

2. The guarded sprinkler assembly of claim 1, wherein the first pair of perimeter posts, the second pair of perimeter posts and the third pair of perimeter posts define a plurality of perimeter posts, the cage including a wire circumscribed about the plurality of perimeter posts.

3. The guarded sprinkler assembly of claim 2, wherein the plurality perimeter posts include six perimeter posts, the wire consisting of a single wire circumscribed about the six posts.

4. The guarded sprinkler assembly of claim 1, wherein the first boundary defines a clearance distance to the deflector member, the fixed distance of the deflector member to the sprinkler body defines a fixed distance-to-clearance distance ratio of about 2:1.

5. The guarded sprinkler assembly of claim 1, wherein the first boundary defines a clearance distance to the deflector member, and wherein the deflector member defines a diameter and a deflector diameter-to-clearance distance ratio of 2:1.

6. The guarded sprinkler assembly of claim 1, wherein the deflector member defines a diameter and the cage defines a diameter, and a ratio of cage diameter-to-deflector diameter ranges from 1.7:1 to 2:1.

7. The guarded sprinkler assembly of claim 1, wherein the cage includes a securement member axially spaced opposite the first boundary, at least one of the first, second and third guard members being fixed to the securement member.

8. A fire protection sprinkler guard comprising:

a wire cage defining an internal volume centered about a central axis, the wire cage including:

a horizontal portion intersecting and perpendicular to the central axis;

a first pair of perimeter posts of the cage extending from the horizontal portion and disposed about the central axis; and a pair of guard members in a fixed spaced apart relationship from one another equidistantly about the central axis, one guard member in the pair of guard members defining a second pair of perimeter posts of the cage and one guard member in the pair of guard members defining a third pair of perimeter posts of the cage, each of the guard members in the pair of guard members including a skewed portion traversing at least a portion of the internal volume between the horizontal portion and the respective second and third pair of perimeter posts to define a first boundary of the cage; and each of the guard members in the pair of guard members including a portion traversing at least a portion of the internal volume axially spaced from the first boundary to define a second boundary of the cage having an insertion passageway for inserting a sprinkler in a pendent orientation.

9. The fire sprinkler guard of claim 8, wherein the first pair of perimeter posts, the second pair of perimeter posts and the third pair of perimeter posts define a plurality of perimeter posts radially disposed about the internal volume, the cage including a wire circumscribed about the plurality of perimeter posts.

10. The fire sprinkler guard of claim 9, wherein the plurality of perimeter posts include six perimeter posts, the wire comprises a wire circumscribed about the six posts between the first boundary and the second boundary.

11. The fire sprinkler guard of claim 8, wherein the guard includes a securement member axially spaced opposite the first boundary, at least one of the first, second and third guard members being fixed to the securement member.

12. A sprinkler guard for guarding a fire protection sprinkler having a frame body and a fluid deflector member affixed to the frame body for installation in a pendent orientation, the sprinkler guard comprising:

a cage having a plurality of guard members defining an internal volume centered about a central vertical axis, the plurality of guard members having a first portion traversing about the internal volume to define a first boundary of the cage, the plurality of guard members having a second portion disposed about the internal volume to define a second boundary of the cage, the plurality of guard members defining an insertion passageway proximate the second boundary for receipt of the sprinkler to locate the fluid deflector member of the sprinkler within the internal volume and centered along the central vertical axis with the deflector member spaced from the first boundary, wherein the first portion of one of the plurality of guard members intersects the central vertical axis, wherein the second portion of the plurality of guard members includes a plurality of perimeter posts radially disposed about the sprinkler extending parallel to the central vertical axis and wherein a wire circumscribed about the plurality of perimeter posts, and wherein the sprinkler guard and the sprinkler define one or more dimensional relationships, including:

(i) a fixed distance between the fluid deflector member and the frame body and a clearance distance from the first boundary of the cage to the deflector member define a ratio of fixed distance-to-clearance distance (H1:H2) that ranges from 1:1 to 2:1;

(ii) a deflector diameter of the fluid deflector member and the clearance distance define a ratio of deflector diameter-to-clearance distance (Dia:H2) that ranges from 1.8 to 2:1; or (iii) a cage diameter of the cage and the deflector diameter define a ratio of cage diameter-to-deflector diameter (WCGE:Dia) that ranges from 1.7:1 to 2:1.

13. The sprinkler guard of claim 12, wherein the cage defines a cage height between the first boundary and the second boundary and a maximum guard height-to-cage height ratio (HGT:HCAG) up to 1.5:1.

14. The sprinkler guard of claim 13, wherein the cage height is about 1.5 inch.

15. The sprinkler guard of claim 12, wherein the first portion of one of the plurality of guard members includes a central portion that intersects the central vertical axis and a skewed portion that slopes from the central portion to define the first boundary of the cage.

16. The sprinkler guard of claim 12, wherein the ratio of fixed distance-to-clearance distance (H1:H2) is one of 1.1:1 or 1:1.

17. The sprinkler guard of claim 12, wherein the fixed distance is 1.5 inches and clearance distance is 0.75 inch.

18. The sprinkler guard of claim 12, wherein the at least one or more dimensional relationships includes at least:

(i) the ratio of fixed distance-to-clearance distance (H1:H2) that ranges from 1:1 to 2:1; and (ii) the ratio of deflector diameter-to-clearance distance (Dia:H2) that ranges from 1.8:1 to 2:1.

19. The sprinkler guard of claim 12, wherein the cage includes a securement member axially spaced opposite the first boundary, at least one guard member in the plurality of guard members being fixed to the securement member.

20. A sprinkler guard for guarding a fire protection sprinkler having a frame body and a fluid deflector member affixed to the frame body, the sprinkler guard comprising:

a wire cage having a plurality of guard members defining an internal volume centered about a central vertical axis, the plurality of guard members having a first portion traversing about the internal volume to define a first boundary of the cage, the plurality of guard members having a second portion disposed about the internal volume to define a second boundary of the cage, the plurality of guard members defining an insertion passageway proximate the second boundary for receipt of the sprinkler to locate the fluid deflector member of the sprinkler within the internal volume and centered along the central vertical axis with the fluid deflector member spaced from the first boundary, and a circumscribing member secured to each of the plurality of guard members between the first boundary and the second boundary, wherein each of the second portion of each of the plurality of guard members include a perimeter post that extends axially parallel to the central vertical axis and is spaced equidistant from the central vertical axis and wherein the circumscribing member is secured to each perimeter post.

21. The sprinkler guard of claim 20, wherein the first portion of the each of the plurality of guard members include a skewed portion with respect to the central vertical axis.

22. The sprinkler guard of claim 21, wherein the first portion of one of the plurality of guard members includes a central portion that intersects the central vertical axis and is perpendicular to the central vertical axis.

23. The sprinkler guard of claim 22, wherein the circumscribing member is circular, and wherein a cage diameter of the cage defined by the circumscribing member and a deflector diameter of the fluid deflector member define a ratio of cage diameter-to-deflector diameter (WCGE:Dia) that ranges from 1.7:1 to 2:1.

* * * * *